United States Patent [19]

Kimura et al.

[11] 3,812,533

[45] May 21, 1974

[54] INFORMATION STORAGE UNIT TRANSDUCER POSITIONING SYSTEM

[75] Inventors: Noboru Kimura, Gardena; Kenneth G. Junkert, Manhatten Beach, both of Calif.

[73] Assignee: Vermont Research Corporation, North Springfield, Vt.

[22] Filed: Dec. 22, 1972

[21] Appl. No.: 317,678

[52] U.S. Cl. ................360/77, 340/172.5, 360/131

[51] Int. Cl....................... G11b 17/00, G06f 13/06

[58] Field of Search... 340/172.5, 174.1 C, 174.1 B, 340/174.1 J, 174.1 K; 179/100.2 S

[56] References Cited

UNITED STATES PATENTS

| | | | |
|---|---|---|---|
| 3,185,972 | 5/1965 | Sippel | 340/174.1 |
| 3,200,385 | 8/1965 | Welsh | 340/174.1 |
| 3,126,535 | 3/1964 | Streeter | 340/174.1 |
| 3,246,307 | 4/1966 | Stanley | 340/174.1 |
| 3,375,507 | 3/1968 | Gleim et al. | 340/174.1 |
| 3,449,735 | 6/1969 | Cogar | 340/174.1 |
| 3,479,664 | 11/1969 | Stuart-Williams | 340/174.1 |
| 3,491,347 | 1/1970 | Faraand | 340/174.1 |
| 3,534,344 | 10/1970 | Santana | 340/174.1 |
| 3,686,649 | 8/1972 | Behr | 340/174.1 |
| 3,699,555 | 10/1972 | DuVall | 340/174.1 |

*Primary Examiner*—Paul J. Henon
*Assistant Examiner*—James D. Thomas
*Attorney, Agent, or Firm*—Fraser and Bogucki

[57] ABSTRACT

An information storage system is disclosed in which a reticle and associated photocell are used to effect coarse positioning of a transducer relative to a desired informational track, following which a fine system is used for track accessing and following. The transducer senses both information and servo data which are serially disposed on a storage medium such as a magnetic disc, the servo data comprising groups of magnetized pattern areas corresponding to groups of concentric tracks. The pattern areas have staggered flux reversals providing relative track indentification for each group of tracks. A digital address defining the location of a desired track within a group of tracks is decoded so as to generate a window signal determining the polarity of errors in the position of the transducer. The polarities of the sensed flux reversals are coded in time under the control of the window signal so as to provide an error signal which communicates with an actuator to move the transducer toward the desired track and into precision alignment therewith.

22 Claims, 5 Drawing Figures

| DEMAND ADDRESS | LSB $B_2, B_1, B_0$ | | | DECODED OUTPUTS $D_0, D_1, D_2, D_3, D_4, D_5, D_6, D_7$ | | | | | | | |
|---|---|---|---|---|---|---|---|---|---|---|---|
| 125 | 1 | 0 | 1 | 0 | 0 | 0 | 0 | 0 | 1 | 0 | 0 |
| 126 | 1 | 1 | 0 | 0 | 0 | 0 | 0 | 0 | 0 | 1 | 0 |
| 127 | 1 | 1 | 1 | 0 | 0 | 0 | 0 | 0 | 0 | 0 | 1 |
| 128 | 0 | 0 | 0 | 1 | 0 | 0 | 0 | 0 | 0 | 0 | 0 |
| 129 | 0 | 0 | 1 | 0 | 1 | 0 | 0 | 0 | 0 | 0 | 0 |
| 130 | 0 | 1 | 0 | 0 | 0 | 1 | 0 | 0 | 0 | 0 | 0 |
| 131 | 0 | 1 | 1 | 0 | 0 | 0 | 1 | 0 | 0 | 0 | 0 |
| 132 | 1 | 0 | 0 | 0 | 0 | 0 | 0 | 1 | 0 | 0 | 0 |
| 133 | 1 | 0 | 1 | 0 | 0 | 0 | 0 | 0 | 1 | 0 | 0 |

INFORMATION STORAGE UNIT TRANSDUCER POSITIONING SYSTEM

BACKGROUND OF THE INVENTION

1. Field of the Invention

This invention relates to an information storage system. More particularly, the invention relates to transducer positioning in random access memory units.

2. Description of the Prior Art

In the past, random access memory units used coarse positioning systems for moving transducers in proximity with addressed tracks. Fine positioning systems maintained transducers in alignment with the accessed tracks or tracks adjacent those accessed by coarse positioning.

Various types of fine positioning systems included pawl and detents, varying width reflectance patterns on magnetic recording discs and rigidly coupled dual transducers, one of which followed interior servo tracks of a magnetic record disc, while the other communicated with outer data tracks of the disc.

Other systems used a plurality of mechanically ganged transducers communicating with a corresponding plurality of disc surfaces. One transducer track followed a surface having servo information causing the remaining transducers to track follow the corresponding remaining surfaces. Multiple disc ganged transducer systems though satisfactory for lower density random access storage units, were inadequate for high density storage such as on the order of 600 tracks per inch. A slight mechanical misalignment of the ganged transducers caused inaccurate high density track following.

The prior art includes servo positioning systems using interspersed servo and information data recorded with angularly disposed heads at alternating angles. In such systems, pairs of joined transducer heads were disposed at opposing angles to the track line for minimizing interference between adjacent tracks. Such a system typically used a coarse positioning system for placing the transducer within at least one and one half tracks of the addressed track. A fine positioning servo system including a transducer sensing pairs of flux reversals caused the transducer heads to be precisely positioned about the recorded track. Such fine positioning servo units are unable to distinguish between tracks within about at least ± 2 tracks of the addressed track. The angular recording techniques of such servo units required specialized angular ganged playback head configurations.

Higher density storage systems such as those having a track density of about 600 tracks per inch are unable to use the aforementioned positioning systems. As track density increases, the distance between adjacent tracks decreases. High density requires either the use of high accuracy coarse positioning or wide track range fine positioning, preferably with a rapid response to errors resulting from inaccurate coarse positioning. Wide track range refers to the distance which the fine positioning system can move the transducer to a desired location. It is generally costly and impractical to provide a coarse positioning system capable of rapidly accessing desired tracks with an accuracy of ± 1½ tracks where the track density is on the order of 600 tracks per inch. Mechanical tolerances for ganged transducer systems require high precision mechanical components. Factors such as temperature variations and disc runout or imprecise disc centering may cause sufficient errors to place the transducer out of the range of prior art track following systems. Similarly it is difficult to provide an inexpensive fine positioning system accurate over a wide range such as at least ± 2 tracks with a rapid convergence rate. Thus, it would be desirable to use an inexpensive coarse positioning unit in conjunction with a relatively inexpensive fine positioning unit to achieve positioning of a transducer over accessed tracks.

SUMMARY OF THE INVENTION

Information storage systems in accordance with this invention generally include a coarse positioning system accessing an addressed track within a predetermined tolerance and a fine positioning servo system.

The fine positioning servo system includes a data separator circuit recovering servo data from the magnetic flux reversal patterns sensed by the transducer. A relative address defines the location of a desired or addressed track with respect to a group of tracks. The relative address is used to generate a servo window or a time varying gate which provides a direction or polarity associated with the servo information. Further circuitry provides a signal related to the servo window and the servo information provided by the data separator. The transducer is thereby caused to move in a direction and at a velocity related to the position of the transducer with respect to the addressed track.

The servo information is pre-recorded generally within sectors on a recording medium such as a magnetic disc. The servo information is interspersed with data storage location sectors therebetween defining nominal data track lines. The servo information includes generally repetitive groups of staggered magnetized pattern areas disposed about the nominal track lines of corresponding data track groups. The servo information further includes reference means such as a common group flux reversal defining a common time base for a group of magnetized pattern areas.

DESCRIPTION OF THE PREFERRED EMBODIMENT

Figure 1:
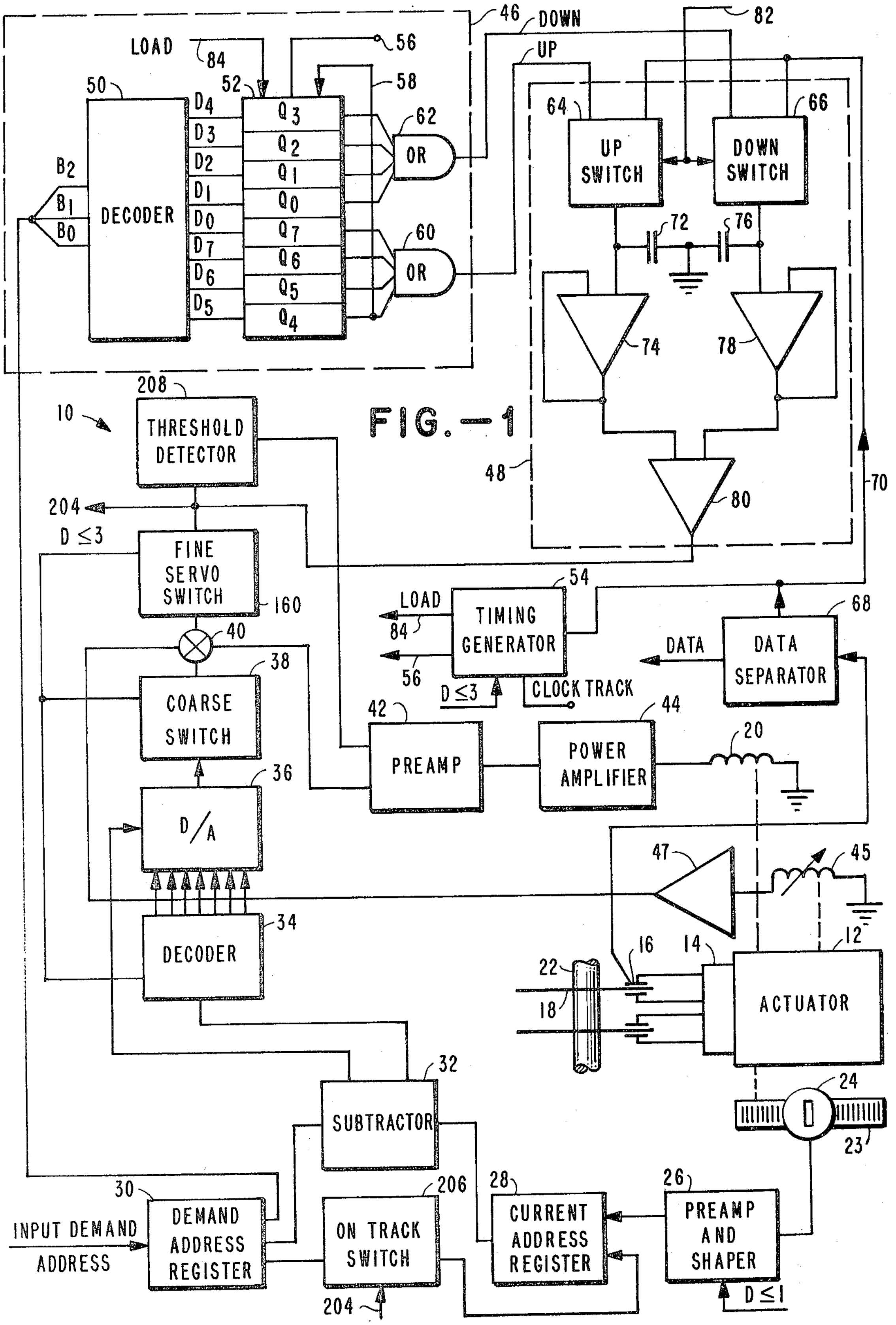
FIG. 1 is a block diagram of a preferred embodiment of an information storage system in accordance with the invention.

Referring particularly to FIG. 1, an information storage system 10 in accordance with the invention comprises an actuator 12 having a reciprocating carriage 14 for moving a plurality of transducers including a transducer 16 with respect to a plurality of recording mediums including a medium 18. The recording mediums are herein shown as comprising magnetic discs, although other mediums can be used in accordance with the invention. The recording mediums are rotatably positioned about a spindle 22.

The actuator 12 includes an actuator winding 20 which is operative to cause movement of the carriage 14 in response to signals applied thereto. The system 10 includes a coarse positioning system which accesses an addressed track on the recording medium 18 within a predetermined tolerance. A fine positioning system within the system 10 accesses the particular addressed track and precisely aligns the transducer 16 thereabout.

Though the coarse positioning system described hereafter has been available in the prior art, it has been found to be particularly beneficial for use with systems according to the invention because of its low cost, simplicity and reliability. Optical positioning is referred to in a brochure 5007, "Caelus 303 Disk Cartridge Drive" published by Caelus Memories Inc., San Jose, Calif. Circuitry similar to that discussed hereinbelow is more fully described in U.S. Pat. No. 3,699,555, Du Vall, issued Oct. 17, 1972. The coarse positioning system includes a reticle 23 and a photocell 24. The reticle 23 may be attached to the reciprocating carriage 14 such that the reticle 23 moves with respect to the photocell 24 as the carriage 14 is moved. A modified sine wave is thereby generated at the photocell 24 corresponding to carriage travel. The peaks of the generated sine wave bear a relationship to tracks on the recording medium 18 which are traversed by the transducer 16.

The signal generated at the photocell 24 in response to movement of the reticle 23 is amplified and shaped by a preamplifier and shaper 26 prior to being passed to a current address register 28 where it is stored as a representation of the approximate location of the transducer 16. A demand address register 30 stores the address of a track on the recording medium 18 to be accessed. A digital subtractor 32 coupled between the demand address register 30 and the current address register 28 develops a digitally coded number representing the difference between the addressed track and the current track location of the transducer 16. The subtractor 32 provides the digitally coded number to a decoder 34. The decoder 34 decodes the digital number from the subtractor 32, and passes the resulting digital value to a digital to analog converter 36 where the analog equivalent thereof is generated. The analog equivalent which comprises a voltage representing the difference between the approximate transducer location and the addressed track location is passed via a coarse switch 38 and a control junction 40 to a preamplifier 42. The coarse switch 38 performs the function of enabling the coarse positioning system when the transducer is distant from a desired track and disabling the coarse positioning system when the transducer is close to the desired track. Similarly, a fine servo switch 160 enables a fine servo positioning system when the trasducer is close to the desired track. Such switching is common when coarse and fine positioning systems are used. For example, a system presented in the Du Vall patent, previously cited, uses switching to enable a fine positioning control. Similarly, in U.S. Pat. No. 3,034,111, Hoagland et al., issued May 8, 1962, a switch performs the function of switching a data storage system from a coarse to a fine mode of operation. The control junction 40 is an ordinary summing junction such as an operational amplifier having inputs from the coarse switch 38, the fine servo switch 160 and the circuit 46 and an output coupled to the preamplifier 42.

The analog voltage at the output of the converter 36 is weighted according to the distance of the transducer 16 from its addressed destination with respect to the initial value stored in the current address register 28. The weighted voltage provides a desired velocity, acceleration and deceleration of the transducer 16 for efficient and relatively accurate positioning. A velocity transducer 45 of the actuator 12 provides a signal through amplifier 47 representing a velocity of carriage 14. The control junction 40 subtracts this velocity signal from the weighted signal and applies the difference to the preamplifier. An ON TRACK switch 206 is coupled between the demand address register 30 and the current address register 28. Lead 204 provides a signal to ON TRACK switch 206 for causing the address stored in the demand address register 30 to be duplicated by the current address register when the transducer 16 is located close to the demanded position, such as, for example within 100 microinches. The preamplifier 42 is coupled through a power amplifier 44 to energize the winding 20 and drive the actuator 12 and included transducer 16 toward the accessed track on the recording medium 18.

The coarse positioning system just described provides access to an addressed track within an adequate tolerance such as, for example, ± 3 tracks at a 600 track per inch density for the fine positioning system described below.

The fine positioning system of the invention as shown in FIG. 1 includes means responsive to an indication of a desired location or a servo window circuit 46 and a junction circuit 48. The servo window circuit 46 is for generating a control signal defining servo information polarity according to the time of reception by the junction circuit 48 of incoming servo information. The junction circuit 48 provides an output signal corresponding to the magnitude of servo information sensed by the transducer 16 and in accordance with the servo window circuit 46 moving the transducer 16 in a desired direction and velocity.

The servo window circuit 46 includes a decoder 50 coupled to receive a plurality of the least significant bits $B_2$, $B_1$, $B_0$, of the digital number stored in the demand address register 30. Binary digital logic is used with the demand address register 30, though other logic bases may be used. The three least significant bits of the demand address uniquely define $2^3$ or 8 corresponding track positions. It is particularly advantageous to use an 8 track group for the embodiment described herein, though other group sizes and bit levels are contemplated within the scope of the invention. The decoder 50 responds to the least significant bits (LSB) by energizing one of a plurality of decoded outputs, $D_4$, $D_3$, $D_2$, $D_1$ $D_0$, $D_7$, $D_6$, $D_5$, each of which corresponds to a particular track of a track group on the recording medium 18. Only one line from the decoder 50 is energized at any particular time for a particular track address in the preferred embodiment. Of course, other logic designs having different energized output configurations are within the scope of the invention. Information storage means in the form of shift register 52 has a plurality of inputs coupled to the outputs of the decoder 50. The shift register 52 is loaded at appropriate times under the control of a timing generator 54. The timing generator 54 provides clocking pulses via a lead 56 to advance data bits through the shift register 52 as indicated by a lead 58 coupled between one of the outputs of the shift register 52 and an input thereof. Seven clocking pulses from the timing generator 54 provide a complete servo window during the interval over which servo information from the recording medium 18 is sensed.

The shift register 52 is shown in FIG. 1 as comprising eight bits. However, it should be recognized that a shift register having four or more bits may be used depending upon the accessing tolerance of the coarse positioning system and the desired track range of the fine positioning system. For example, an inaccurate coarse positioning system or a higher track density requires a wider range fine positioning and hence a higher level shift register.

A pair of OR gates 60 and 62 are used in the generation of proper servo windows by the circuit 46. The OR gate 62 is coupled to the $Q_3$, $Q_2$, $Q_1$, and $Q_0$ positions of the shift register 52 to provide a DOWN servo window while the OR gate 60 is coupled to the $Q_7$, $Q_6$, $Q_5$, and $Q_4$ positions to provide what will be referred to as an UP servo window. Thus, the circuit 46 provides a bilevel signal having two different values.

The junction circuit 48 includes gating means or an UP switch 64 communicating with the OR gate 60 and a DOWN switch 66 communicating with the OR gate 62. The UP switch 64 and the DOWN switch 66 also communicate with a data separator 68 via a lead 70. The data separator 68 which is coupled to the transducer 16 separates data from servo information so as to provide the servo information to the UP switch 64 and the DOWN switch 66. The data separator 68 may be, by way of example, simply a low pass filter to pass lower frequency signals, though other circuits are suitable. An example of a data separator is presented in U.S. Pat. No. 3,534,344, Santana, issued Oct. 13, 1970. The UP switch 64 and the DOWN switch 66 may comprise field effect transistors or other suitable circuit elements. The UP switch 64 is coupled to first signal storage means in the form of a grounded capacitor 72 as well as to a voltage follower 74. Similarly the DOWN switch 66 is coupled to second signal storage means in the form of a grounded capacitor 76 and to a voltage follower 78. The capacitors 72, 76 store servo information gated by the switches 64, 66. The voltage followers 74, 78 have high impedance inputs to prevent discharge of the capacitors 72, 76. The voltage followers 74, 78 are coupled to a difference circuit 80, typically an operational amplifier coupled in a differential mode. The difference circuit 80 provides an error signal of the desired amplitude and polarity. The error signal also provides an indication of the relative position of the transducer 16 with respect to a desired transducer position. A lead 82 is coupled to provide for the discharge of the capacitors 72, 76 at the beginning of a servo sector. A flux reversal sensed by the transducer 16 provides a signal via the lead 82 to provide capacitor discharge.

The timing generator 54 generally includes a digital counter and frequency divider for providing appropriate timing signals to the junction circuit 48 and the servo window circuit 46. The timing generator 54 is coupled to receive signals provided by a clock track located close to an edge of the recording medium 18. The timing generator 54 has inputs for receiving the clock track signals and a $D \leq 3$ signal for example, which is described hereafter. The timing generator 54 has outputs including the lead 70 which provides for the gating of servo information to the junction circuit 48, a LOAD lead 84 which causes the condition of the decoder 50 to be loaded into the shift register 52 and the lead 56 which provides a signal causing advancement of the shift register 52 as indicated by the lead 58.

A threshold detector 208 comprises a double sided Schmitt trigger (not shown) coupled to the difference circuit 80. The threshold detector provides for increasing the gain of the preamplifier 42 and therefore the closed loop gain of the fine positioning system when the transducer 16 approaches the desired location. For example, the threshold detector may sense when the difference signal represents a transducer position of within ± 100 microinches of the desired location. Within this range, the threshold detector causes a signal to be applied to the preamplifier 42. The resulting increased closed loop gain reduces undesirable effects of external disturbances.

The velocity signal provided by the velocity transducer 45 and the amplifier 46 to the control junction 40, dampens the response of the fine positioning system.

Figures 2, 5:
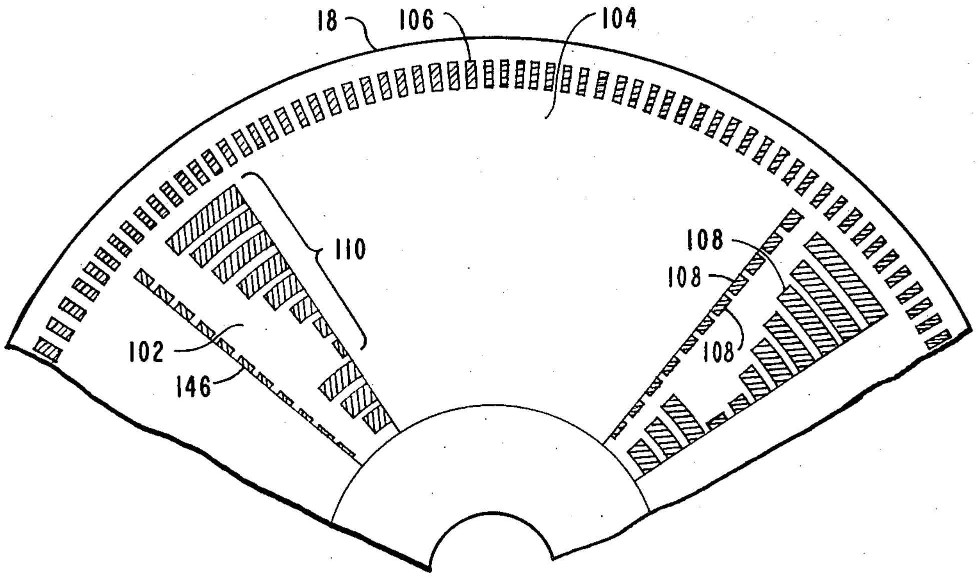
FIG. 2 is a portion of a storage disc having exaggerated servo information represented by groups of staggered magnetized pattern areas on servo sectors located between data sectors in accordance with the invention.
FIG. 5 is a truth table showing the manner of decoding the least significant bits of an address to define a location within a track group.

FIG. 2 illustrates a portion of a magnetic disc which may comprise the recording medium 18 in the arrangement of FIG. 1 and which has a plurality of servo sectors 102 containing servo information and data sectors 104 containing data information. Servo sectors 102 have a plurality of servo information recordings along the tracks for providing servo signals at times within an interval corresponding to the location of the transducer with respect to the various tracks of a group 110. A pre-recorded timing pattern 106 adjacent the outer periphery of the disc 18 provides a timing base for the information storage system. It should be recognized that the sizes of the recorded areas comprising the servo information shown in FIG. 2 are greatly exaggerated for the sake of clarity. Signal indicia or flux reversals 108 are represented by boundaries between shaded and unshaded areas. Note that the flux reversals in the group 110 have a monotonically staggered relationship for uniquely identifying the tracks of group 110. Monotonicity is not required providing appropriate servo window logic is selected. The basic requirement is that a group of flux reversals uniquely identify corresponding tracks in the corresponding track group. The flux reversals are spatially staggered to generate servo signals at times related to the movement of the transducer 16 thereover. It should be recognized that the surface of the disc 18 may have on the order of 1,300 data tracks and a corresponding number of servo tracks.

Figure 3:
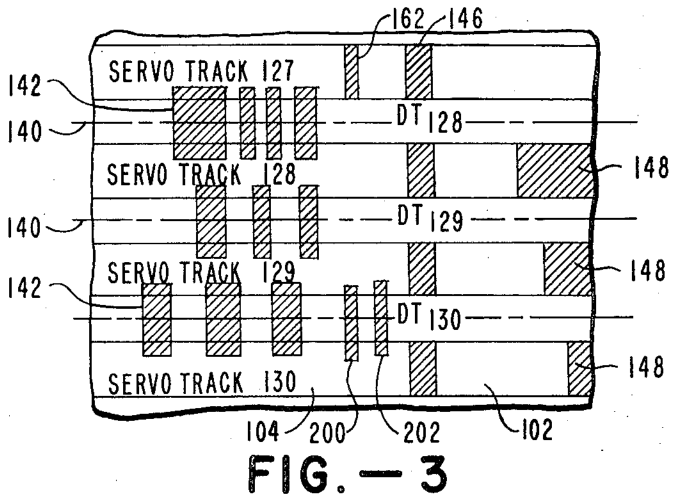
FIG. 3 is an expanded portion of the storage disc of FIG. 2 showing magnetized pattern areas representing servo information about the nominal track lines of data tracks.

Referring to FIG. 3, a portion of the disc 18 is shown in greatly enlarged fashion. The wider tracks labeled as servo tracks 127, 128, 129 and 130 represent paths upon which magnetized servo pattern areas are recorded. The narrower paths between the servo tracks labeled $DT_{128}$, $DT_{129}$ and $DT_{130}$ are data track locations defined by nominal track lines 140. The actual data tracks have a width determined by the transducer gap width. The gap width is generally somewhat larger than the spacing between servo tracks. Information records 142 are shown recorded in the information sector 104. Magnetic patterns 146 provide flux reversals for timing. Magnetic pattern areas 148 provide the staggered flux reversals used to uniquely identify a particular track within a group of tracks.

The pattern areas 146 of FIG. 3 provide flux reversals for the generation of sector signals or reference means indicating the beginning of a servo sector. Pattern areas 146 further provide flux reversals for initiating the discharge of capacitors 72, 76 in the FIG. 1 arrangement.

To illustrate the operation of the invention, assume that the desired address comprises the data track 130. A coded address is applied to the demand address register 30 indicating that data track 130 is the desired address. The current address register 28 which had been updated during the previous accessing operation stores a representation of the current location of the transducer 16. Thus if it is assumed that the current address of the transducer 16 is at data track 300 (not shown) then the subtractor 32 determines the digital difference between an address of 300 and an address of 130. The difference is decoded by the decoder 34 and converted by the converter 36 to a weighted analog signal related to the square root of the digital difference as is known in the art. The weighted signal is applied to the preamplifier 42 via the coarse switch 38 which has been previously energized and the control junction 40. The power amplifier 44 energizes the actuator winding 20, moving the transducer 16. The subtractor 32 indicates whether the current address register 28 or the demand address register 30 stores the higher address and communicates this information to the digital to analog converter 36 providing directional polarity to the analog signal at the output of the converter 36.

As the actuator winding 20 causes the transducer 16 to move toward an address of 130, the relative motion of the reticle 23 with respect to the photocell 24 causes the current address register 28 to be updated.

When the difference D between the value stored in the current address register 28 and the value stored in the demand address register 30 is less than or equal to 1, for example, a signal from the decoder 34 turns off the coarse switch 38 and energizes a fine servo switch 160. The preamplifier and shaper 26 is decoupled, while the timing generator 54 is energized. At this point, the coarse positioning system is off and the fine positioning system is operating.

It should be noted that the transducer 16 is likely to be moving as the fine positioning system is activated. The wide tracking tolerance of the fine positioning system of the invention provides for continuous travel of the transducer 16 during change over from the coarse to the fine positioning system. This is advantageous in providing rapid access.

Figure 4:
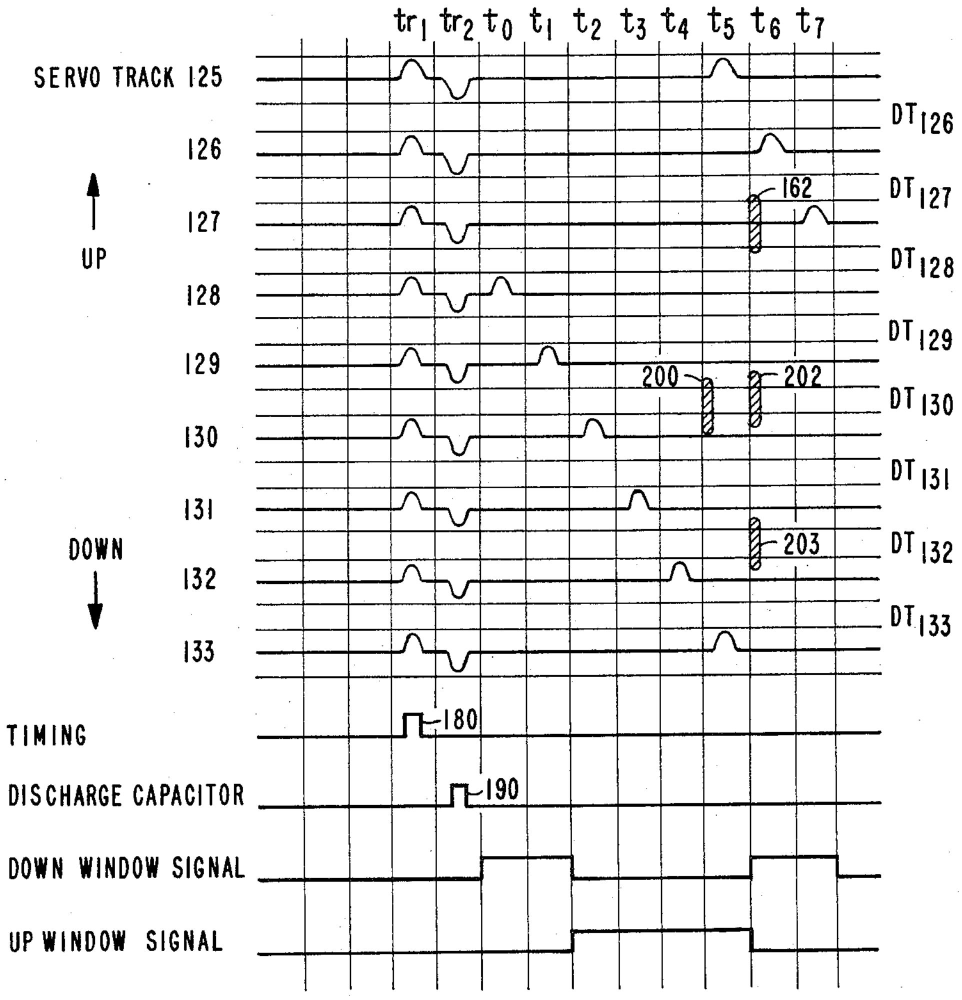
FIG. 4 is a diagram including signals sensed by transducers passing over associated servo tracks, the signals being superimposed over the storage disc.

Continuing with the present example of operation it is assumed that when the coarse positioning system is disabled the transducer 16 is positioned across the servo track 127 as indicated by a transducer position 162 shown in FIGS. 3 and 4. The discrepancy between the demanded address, that of the data track 130 and the transducer position 162 is caused by inaccuracies in the coarse positioning system. Factors such as temperature variation, disc runout and mechanical inaccuracies are compensated by the fine servo system of the invention.

When the difference D is less than or equal to 3, the timing generator 54 is energized. The timing generator 54 searches for a valid timing signal. Such a valid timing signal 180 is illustrated as occuring during the interval $tr_1$ in FIG. 4. A valid timing signal indicates the beginning of one of the servo information sectors 102. The timing signal 180 resets a counter within the timing generator 54 and applies a LOAD signal and clocking signals to the shift register 54.

The demand address register 30 is set to access the data track 130 ($DT_{130}$). A relative address defining a unique location of a track within a track group is provided by the three least significant bits of the digital value stored in the demand address register 30. It should be recognized that for systems using coarse positioning systems with a track tolerance greater than ± 4 tracks, the number of tracks in a track group may differ from 8 and a different level of least significant bits from the demand address register should be used. Also it should be noted that 3 significant bits are used here since the demand address register 30 is a binary coded register and 3 bits provide eight possible information states. The three least significant bits are decoded by the decoder 50 in accordance with the truth table shown in FIG. 5. Data track 130 represented as a binary number is 10,000,010. The three least significant bits which are therefore 010 are applied to the decoder 50 which follows the truth table of FIG. 5 by energizing output $D_2$ or making it "true" to the exclusion of all other outputs.

The output lines $D_4$, $D_3$, $D_2$, $D_1$, $D_0$, $D_7$, $D_6$ and $D_5$ of the decoder 50 are coupled to the bit positions $Q_3$, $Q_2$, $Q_1$, $Q_0$, $Q_7$, $Q_6$, $Q_5$ and $Q_4$ respectively of the shift register 52 so as to transfer the bit information at the output of the decoder 50 into the shift register 52 upon receipt of a LOAD signal via the lead 84. At the end of time slot $t_0$ as seen in FIG. 4, the lead 58 causes the shift register 52 to move the $Q_1$ value to the $Q_0$ position. The shifting continues until a total of seven shifts have been made. The seven shifts of the shift register 52 generate a servo window. In the present example $D_2$ at the output of the decoder 50 is "true," and therefore $Q_1$ within the shift register 52 is initially "true." During time slots $t_0$ and $t_1$, a signal through the OR gate 60 produces a DOWN window signal as shown at the bottom of FIG. 4. During time slots $t_2$ through $t_5$, $Q_7$ through $Q_4$ are "true," generating an UP window signal. During time slots $t_6$ and $t_7$, $Q_3$ and $Q_2$ are "true," producing a DOWN window signal. The servo window thereby obtained is shown at the bottom of FIG. 4. The servo window is related to the least significant bits of the demand address and uniquely corresponds to one of a group of tracks of a track group.

No signals are generated after $tr_2$ as the transducer 16 scans the servo track 127, until time slot $t_7$. Thus, no signal is applied to the capacitor 72, 76 and no error signal is generated prior to time slot $t_7$. The position 162 of the transducer gap is in substantial alignment with the servo track, causing the generation of a maximum signal during $t_7$. This signal is simultaneously applied to the UP switch 64 and the DOWN switch 66. The DOWN window signal provided by the OR gate 62 is inverted over an interval from $t_0$ to $t_7$ with regard to the OR gate 60 as illustrated, by example, at the bottom of FIG. 4. At $t_7$, the DOWN window signal is provided so that the DOWN switch 66 is turned on during $t_7$ and the UP switch 64 is turned off. The capacitor 76 charges to the amplitude of the servo signal, and the resulting signal is applied to the difference circuit 80. Discharge of the capacitor 76 is inhibited by the voltage follower 78.

The difference circuit 80 provides an output error signal related to the amplitude of the servo signal sensed during $t_7$. The polarity is determined by the manner of coupling the voltage followers 74, 78 to the difference circuit 80. The servo window provides the directional components of the error signal by energizing the UP switch 64 and the DOWN switch 66 during particular time slots.

The error signal at the output of the difference circuit 80 is passed by the fine servo switch 160 and the control junction 40 to the preamplifier 42 and the power amplifier 44 where it is amplified prior to being applied to energize the winding 20. As so energized the winding 20 causes the transducer 16 to move downwardly as seen in FIG. 3 with a maximum velocity corresponding to the maximum flux reversal amplitude sensed by the transducer during time slot $t_7$.

If the transducer 16 originally overlaps the servo tracks 127 and 128, then the transducer 16 senses flux reversals during $t_0$ and $t_7$. During these intervals, the OR gate 62 is "true" causing the signals representing sensed flux reversals during time $t_0$ and $t_7$ to be gated through the DOWN switch 66. The capacitor 76 charges to a value equal to the larger of the two signals. It is within the scope of the invention to provide a means of adding such time displaced multiple signals gated through the DOWN switch 66 or through the UP switch 64. The voltage follower 78 applies a signal to the difference circuit 80, providing an error signal of proper polarity for directing the transducer 16 in a downward direction and of a magnitude somewhat less than the amplitude provided in the previous situation where the transducer 16 was located at the transducer gap position 162.

During the next servo sector 102, the transducer 16 continues to move in a downward direction. If it is assumed that the transducer 16 is temporarily located in a transducer gap position 200 which is slightly out of alignment with the desired position, that of data track 130, then the servo window generated is the same as during the previous sector since the same data track is addressed. It will be noted that the transducer gap position 200 overlaps more of the servo track 130 than the servo track 129 and that the transducer 16 has slightly overshot the demand address. As the transducer 16 traverses the servo sector it senses flux reversals at $t_1$ and $t_2$. The DOWN window signal is "on" at $t_1$ while the UP window signal is "on" at $t_2$.

Since the head gap encompasses only a small portion of the servo track 130 and an even smaller portion of the servo track 129, the signals generated have corresponding small amplitudes. Thus at $t_1$ a very small signal is generated while at $t_2$ a somewhat larger signal is generated. During $t_1$ the DOWN switch 66 is enabled, charging the capacitor 76. During $t_2$, the UP switch 64 is enabled, charging the capacitor 72 to a greater value than the capacitor 76. The error signal represents the difference between the amplitudes of charge on the two capacitors and is provided by the difference circuit 80. Thus a corresponding signal is applied to the winding 20 causing the transducer 16 to move upwardly as seen in FIG. 3 at a velocity somewhat less than during the previous sectors. It should be noted that the flux reversal sensed during the time slot $t_1$ is applied to the capacitor 76 in advance of the flux reversal sensed during the time slot $t_2$. Thus it would seem that the error signal appearing during $t_1$ would drive the transducer 16 further downward. However, the time interval between time slots in each of the servo sectors 102 is small compared to the time interval corresponding to each of the data sectors 104. The transducer 16 maintains an essentially constant velocity during occurrence of the data sector 104 so that a voltage error applied over a portion of the servo sector is inconsequential. Typically, the length of a data sector 104 is on the order of 10 to 25 times the length of a servo sector 102.

The transducer 16 continuously senses servo information causing the servo system to generate appropriate error signals corresponding to a deviation of the transducer 16 from the accessed track. In the situation where the transducer is precisely positioned over the addressed track, in this case a transducer gap position 202, the magnitude of the flux reversal sensed at $t_1$ is equal to the magnitude of the flux reversal sensed at $t_2$. Thus the difference signal provided by the difference circuit 80 is approximately 0. No movement of the transducer occurs until an imbalance is sensed during subsequent servo sectors.

A particularly advantageous feature of the wide track fine servo system in accordance with the invention is that it allows the continuous sampling of servo information without arresting the motion of the transducer 16. Prior art fine track following systems, unable to distinguish between more than a few tracks, must stop the coarse positioning upon approaching the desired location prior to enabling the fine servo track following. If the transducer in prior art systems is not halted before the actuation of track following, the transducer may overshoot the accessed track by a distance beyond the range of the prior art fine servo systems. The wide range of the fine servo system of this invention, as defined by the size of the track group, allows continuous transducer motion enabling faster accessing.

This invention also allows the fine servo system to access adjacent tracks. For example, if it is assumed that the data track 130 has been accessed and it is now desired to access the track 132, defined by the transducer gap position 203, the fine servo system may access this track without requiring the use of the coarse positioning system.

When the transducer 16 is in alignment with the data track 130, or within, for example, 100 microinches thereof, the error signal from the difference circuit 80 is applied to an ON TRACK switch 206, causing the information stored in the demand address register 30 to be duplicated in the current address register 28. The new address of the track 132 is applied to the demand address register 30. The decoder 34 provides a signal ($D \leq 3$) indicating that the difference between the values stored in the demand address register 30 and the current address register 28 is less than or equal to 3. This signal is applied to the timing generator 54, the fine servo switch 160 and the coarse switch 38. The $D \leq 3$ signal disables the coarse switch 38. The $D \leq 3$ signal enables the fine servo switch 160 and the timing generator 54, energizing the fine servo system. The demand address register 30 provides the three least significant bits to the servo window circuit 46. The DOWN switch 66 is enabled during $t_0$, $t_1$, $t_2$ and $t_3$ producing an error signal at the difference circuit 80. When the distance between the center of the address track and the transducer 16 is less than 100 microinches, for example, a signal is applied to the ON TRACK switch 206 causing the instant value stored in the demand address register 30 to be duplicated in the current address register 28.

While a particular preferred embodiment has been described herein, it will be understood by those skilled in the art that changes in form and details may be made within the spirit and scope of this invention.

What is claimed is:

1. An arrangement for positioning a transducer at a desired one of a group of nominally parallel tracks on a record member which undergoes motion relative to the transducer, comprising:

means including the transducer and a plurality of servo recordings along the tracks for generating at least one servo signal within a given time interval, the time of occurrence of the servo signal within the given time interval representing the location of the transducer relative to the various tracks of the group;

means responsive to an indication of desired location of the transducer relative to the various tracks of the group for generating a control signal having changes in the value thereof within the given time interval, the time of occurrence of the changes in the value of the control signal within the given time interval representing the desired location of the transducer relative to the various tracks of the group; and means responsive to the servo and control signals for applying the servo signal to reposition the transducer relative to the tracks in a sense related to the value of the control signal upon generation of the servo signal to locate the desired one of the group of said tracks.

2. An arrangement according to claim 1, wherein the plurality of recordings along the tracks comprise a separate signal indicium within each of the tracks, the signal indicia being spatially staggered along the lengths of the tracks and each being operative to generate a servo signal within the transducer in response to movement of the transducer thereover.

3. An arrangement according to claim 1, wherein the control signal is a bilevel signal having two different values, and the means for applying the servo signal to reposition the transducer is operative to reposition the transducer relative to the tracks in one sense when the control signal is at a first level upon generation of the servo signal and in an opposite sense when the control signal is at a second level upon generation of the servo signal.

4. An arrangement according to claim 1, wherein the indication of desired location of the transducer comprises a coded binary address, and the means for generating a control signal includes means for decoding the coded binary address to provide a signal representing the desired location of the transducer.

5. An arrangement according to claim 1, wherein the means for generating at least one servo signal includes means for moving the transducer relative to the tracks during the given time interval, wherein the means for generating a control signal includes information storage means having a plurality of different positions, each of which is capable of storing a signal, means responsive to the indication of desired location of the transducer for entering a signal in a particular one of the positions of the information storage means representing the desired location of the transducer, means for cycling the stored signal through the various positions of the information storage means during the given time interval, and means coupled to each of the positions of the information storage means for providing the control signal with a first value when the signal is stored in selected ones of the positions of the information storage means and for providing the control signal with a second value when the signal is stored in other than the selected ones of the positions of the information storage means, and wherein the means for applying the servo signal to reposition the transducer includes first and second signal storage means coupled to receive servo signals from the transducer during the given time interval, gating means coupled to the first and second signal storage means and responsive to the control signal for gating servo signals from the transducer to the first signal storage means when the control signal has the first value and for gating servo signals from the transducer to the second signal storage means when the control signal has the second value, and means coupled to the first and second signal storage means for moving the transducer in one direction relative to the tracks in response to servo signals stored in the first signal storage means and in an opposite direction relative to the tracks in response to servo signals stored in the second signal storage means.

6. An arrangement according to claim 5, wherein the information storage means comprises a shift register, the means for providing the control signal with first and second values comprises first and second logic gates, each being coupled to a different plurality of bit positions of the shift register, and the gating means comprise first and second gates, each coupled between the transducer and a different one of the first and second signal storage means, the first gate being operative to pass servo signals from the transducer to the first signal storage means when the control signal has the first value and the second gate being operative to pass servo signals from the transducer to the second signal storage means when the control signal has the second value.

7. An arrangement according to claim 6, wherein the means for applying the servo signal to reposition the transducer includes means coupled to the first and second signal storage means for determining the difference between the values of servo signals stored therein, and means for applying the determined difference to reposition the transducer at the end of the given time interval.

8. The invention as set forth in claim 1, further comprising a coarse positioning system for positioning the transducer proximate a track within the group of nominally parallel tracks.

9. In a random access memory system wherein a coarse positioning system causes a transducer coupled to a movable actuator to move proximate an addressed one of a plurality of tracks within a predetermined tolerance, the combination therewith of fine positioning means comprising:

relative address means for providing a relative address defining the location of an addressed track with respect to a group of tracks;

window generator means for providing a time varying gate in response to the relative address;

means including the transducer for providing a servo signal relating to servo information sensed by the transducer; and junction means for providing an error signal in response to the time varying gate and the servo signal, the error signal being applied to the actuator to cause the transducer to move in a direction and at a velocity relative to the position of the transducer with respect to the addressed track.

10. The invention as set forth in claim 9 further comprising means responsive to the coarse positioning system and coupled to the fine positioning system for enabling the fine positioning system prior to inhibiting of the coarse positioning system.

11. The invention as set forth in claim 9, wherein the fine positioning means has a closed loop gain, and further comprising a threshold detector responsive to the junction means for providing an increased gain when the transducer is within a small predetermined distance from the addressed track.

12. The invention as set forth in claim 9, further comprising means coupled to the coarse positioning system for providing an indication related to the difference between an addressed track and a transducer position and means responsive to the indication for bypassing the coarse positioning system and enabling the fine positioning system when the indication is less than a particular level.

13. The invention as set forth in claim 9, wherein the window generator means includes shift register means having a plurality of storage locations corresponding to a plurality of tracks of a track group, said shift register means being coupled to receive the relative address, and logic means communicating with the shift register means to provide an output defining time intervals representing track positions on opposite sides of the relative address.

14. The invention as set forth in claim 13, wherein the relative address means includes decoding means, and means communicating least significant digits of the relative address to the decoding means, said decoding means providing a plurality of outputs corresponding to tracks of a track group and being energized with respect to the track of the relative address.

15. An arrangement for positioning a transducer at a desired location along an axis relative to a plurality of nominally parallel tracks on a record member which is movable in a generally transverse direction relative to the axis, the lengths of the tracks being divided into plural data blades having servo blades interspaced therebetween, comprising:

a servo signal indicium recorded in each track within a servo block, the servo signal indicia within each servo block being staggered so as to successively pass the axis as the record member undergoes motion relative to the axis;

means for providing a servo signal related to servo signal indicia sensed by the transducer;

means providing a binary number representing a desired one of the tracks at which the transducer is to be located;

register means having a plurality of stages;

decoder means responsive to the binary number for entering data in a selected one of the stages of the register representing the desired one of the tracks each time a servo block begins to pass the axis;

means for circulating the entered data through the register means which the servo block passes the axis;

logic means coupled to each of the stages of the register means for providing one UP signal when the entered data is in selected ones of the register stages and a DOWN signal when the entered data is in other than the selected ones of the register stages; and means coupled to the servo signal providing means and the logic means for moving the transducer in one direction along the axis in response to each servo signal indicium received by the separating means when the UP signal is present and for moving the transducer in an opposite direction along the axis in response to each servo signal indicium received by the servo signal providing means when the DOWN signal is present.

16. An arrangement in accordance with claim 15, wherein the servo signal indicium recorded in each track comprises a change in the polarity of magnetic flux.

17. An arrangement in accordance with claim 15, wherein the logic means comprises first and second OR circuits, the first OR circuit being coupled to the selected ones of the register stages to provide the UP signal and the second OR circuit being coupled to the other than the selected ones of the register stages to provide the DOWN signal.

18. An arrangement in accordance with claim 15, wherein the means for moving the transducer includes first and second capacitors, first and second switches respectively coupling the first and second capacitors to receive and store the servo signal indicia from the separating means when turned on, the first and second switches being respectively turned on by the UP and DOWN signals, means coupled to the first and second capacitors for determining the difference between the values of signal indicia stored in the first and second capacitors, and means coupled between the means for determining the difference and the first and second capacitors for preventing discharge of the capacitors except upon command.

19. A random access storage system comprising:

a rotatably mounted storage medium;

transducer means disposed adjacent the storage medium;

a reciprocating actuator coupled to move the transducer means relative to the storage medium;

coarse positioning means coupled to the transducer means and the actuator for accessing the transducer means to the storage medium within a predetermined tolerance;

servo information and data information interspersed along nominal track lines on the storage medium, the servo information comprising a plurality of groups of staggered magnetized pattern areas defining corresponding groups of nominal track lines;

means coupled to the transducer means providing a servo signal; and fine positioning means coupled to the data separation means and the actuator for generating a signal precisely positioning the transducer means with respect to an addressed track, said fine positioning means comprising means defining a relative address corresponding to the addressed track, window generating means responsive to the relative address for controlling the gating of servo information from the servo signal providing means, and junction means responsive to the servo information from the servo signal providing means and the window generating means for generating a signal causing the transducer means to move with a direction and velocity corresponding to a position sensed by the transducer means and the relative address.

20. The invention as set forth in claim 19, wherein the coarse positioning means includes reticle transducer means for generating a signal having a frequency bearing a relationship to travel of the transducer means, the window generating means includes a shift register for cycling a plurality of data bits corresponding to one of a plurality of tracks in a track group, and logic means communicating with the shift register and providing an output bearing a relationship to the state of the bits of the shift register and elapsed time with respect to a time slot defined by the relative address, and the junction means includes first capacitor means and second capacitor means for storing signals received at the junction means during different time intervals of a servo sector and difference means providing a signal related to the difference in magnitudes of signals stored by the first capacitor means and the second capacitor means.

21. A data storage member having pre-recorded servo information thereon defining nominal data track lines, said servo information extending along portions of the data track lines separated by other portions of the track lines which define data storage locations, said servo information comprising groups of staggered information records disposed about the nominal track lines of corresponding data track groups, and reference means defining a common time base for each data track group.

22. A data storage member according to claim 21, wherein the member comprises a disc having a magnetizable surface on which the servo information is recorded, the groups of staggered information records comprising flux reversals defining magnetized pattern areas.

* * * * *

PO-1050
(5/69)

UNITED STATES PATENT OFFICE
CERTIFICATE OF CORRECTION

Patent No. 3,812,533 Dated May 21, 1974

Inventor(s) Noboru Kimura and Kenneth G. Junkert

It is certified that error appears in the above-identified patent and that said Letters Patent are hereby corrected as shown below:

Column 3, lines 61 and 62, "trasducer" read --transducer--. Column 4, line 61, after "$D_1$" and before "$D_0$" insert a comma --,--. Column 8, line 9, after "register" change "54" to --52--.

Signed and sealed this 8th day of October 1974.

(SEAL)
Attest:

McCOY M. GIBSON JR.
Attesting Officer

C. MARSHALL DANN
Commissioner of Patents

UNITED STATES PATENT AND TRADEMARK OFFICE
CERTIFICATE OF CORRECTION

PATENT NO. : 3,812,533

DATED : May 21, 1974

INVENTOR(S) : Noburu Kimura et al

It is certified that error appears in the above-identified patent and that said Letters Patent are hereby corrected as shown below:

Column 4, line 6, after "the" (first occurrence), "circuit 46" should read --amplifier 47--. Column 6, line 27, after "amplifier" and before "to", "46" should read --47--. Column 8, line 9, after "register" and before the period ("."), "54" should read --52--; line 44, after "gate" and before "produces", "60" should read --62--. Column 13, line 51, after "data" and before "having", "blades" should read --blocks--; line 51, after "servo" and before "interspaced", "blades" should read --blocks--. Column 14, line 2, after "means" and before "the" (first occurrence), "which" should read --while--; line 13, after "the", "separating" should read --servo signal providing--; lines 34 and 35, "separating" should read --servo signal providing--; line 63, after "the", "data separation" should read --servo signal providing--.

Signed and Sealed this

*Twentieth* Day of *July 1982*

[SEAL]

*Attest:*

GERALD J. MOSSINGHOFF

*Attesting Officer* *Commissioner of Patents and Trademarks*